UNITED STATES PATENT OFFICE.

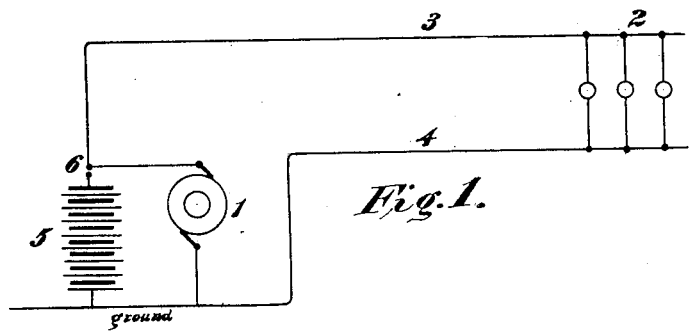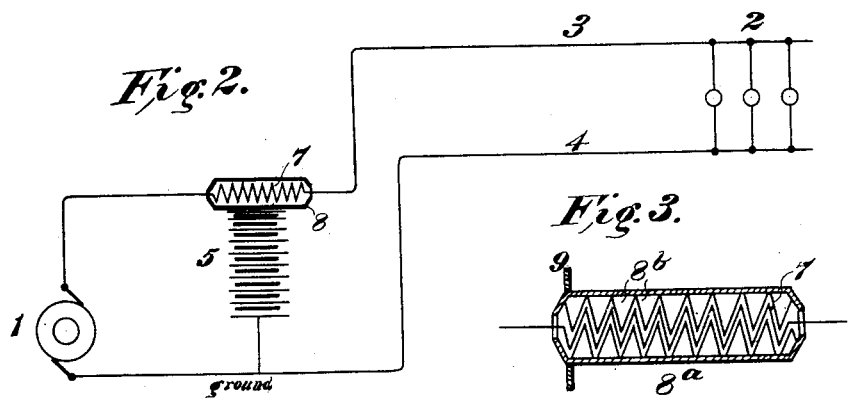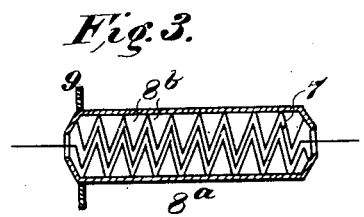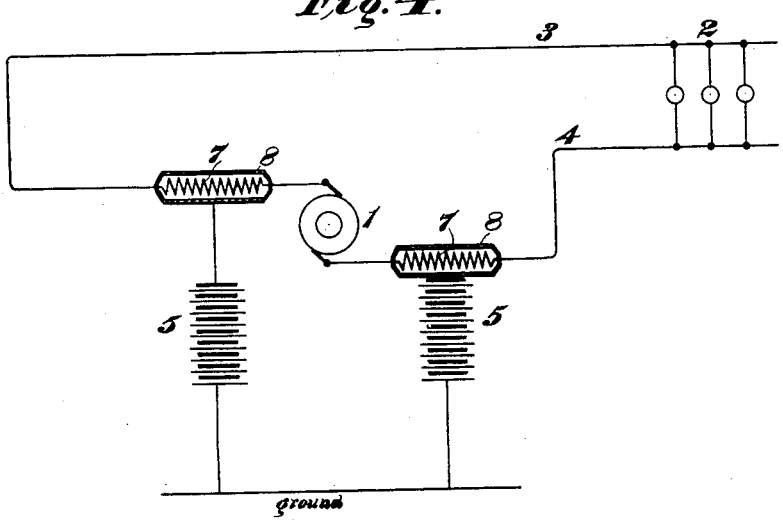

CHARLES J. REED, OF PHILADELPHIA, PENNSYLVANIA.

LIGHTNING-ARRESTER.

SPECIFICATION forming part of Letters Patent No. 660,313, dated October 23, 1900.

Application filed February 17, 1899. Serial No. 705,844. (No model.)

*To all whom it may concern:*

Be it known that I, CHARLES J. REED, a citizen of the United States, residing in Philadelphia, in the county of Philadelphia and State of Pennsylvania, have invented a new and useful Improvement in Lightning-Arresters, (Case No. 808,) of which the following is a specification.

My invention relates to devices, known as "lightning-arresters," which are employed for preventing harmful atmospheric electric discharges from passing to electrical apparatus through conductors connected thereto; and it has for its object to provide a protective device that shall be simple in construction and durable and effective in service.

My invention is especially adapted for use in connection with electric-power circuits supplied by large direct-current generators or rotary transformers of comparatively low resistance.

In the accompanying drawings, Figure 1 is a diagram of an electric circuit having one insulated line conductor and one earth or ground conductor, the insulated conductor being provided with one form of my invention. Fig. 2 is a similar view of a system provided with a modified form of my invention. Fig. 3 is a detail view, on an enlarged scale, of a modification of one feature of my invention; and Fig. 4 is a circuit having two insulated line conductors, each of which is provided with my invention.

In each of Figs. 1, 2, and 4 of the drawings a direct-current generator 1 supplies translating devices 2 through a positive conductor 3 and negative conductor 4, the latter in each of Figs. 1 and 2 being in whole or in part the ground. In each of Figs. 1, 2, and 4 several neutral electrolytic cells 5 are connected in series, one terminal of such series being electrically connected to the ground. I prefer to employ in this connection electrolytic cells comprising sheets of lead separated by a porous non-conducting substance soaked in dilute sulfuric acid on account of the convenience and reversibility of such cells; but I do not intend to limit my invention to the use of any particular form or kind of electrolytic cells.

In the system shown in Fig. 1 the upper terminal of the series of electrolytic cells 5 is separated from any selected or desired point in the conductor 3 by a small spark-gap 6, of suitable form and dimensions, to facilitate the escape to the ground of any electrical charge that may be acquired by the conductor 3 from the atmosphere. Since discharges of atmospheric electricity are alternating in character, they will pass easily through the electrolytic cells without setting up a counter electromotive force of polarization therein, while the current from the generator 1, being unidirectional, will not follow the arc formed by the static discharge without producing almost instantly a counter electromotive force of polarization that is sufficient to effectually stop the flow of current from the generator to ground. The number of cells in the series should be sufficient to give a counter electromotive force either equal to or greater than the electromotive force of the generator. This counter electromotive force of polarization affords perfect security against the passage of current from the generator to ground, and thus enables me to use a special form of spark-gap which would not otherwise be feasible. Such a form of device I have shown in Figs. 2 and 4, in which the conductor 3 is formed into or connected to the terminals of a conductor 7, either coiled into a helix or bent into zigzag form. Surrounding this helix or zigzag structure is a metallic tube 8, insulated from the part 7 by an air-space or otherwise, but in close proximity to it. The tube 8 is electrically connected to the upper terminal of the series of neutral cells 5. It will be seen that this device 7 8 affords a large number of points for the discharge of the static electricity, and if the part 7 is in the form of a helix it also presents a choking-coil effect, which assists in preventing the passage of the static charge to the generator.

In Fig. 3 the helix or zigzag conductor 7 is or may be the same as shown in Fig. 2. In this form of the device the interior of the tube $8^a$ is provided between the coils or bends of the conductor 7 with projections or ribs $8^b$ in order to prevent the discharge from jumping across from one turn of the coil to the next. I have also shown the tube $8^a$ as provided at or near one end with a disk 9, of any suitable diameter, in order to prevent discharges from passing from the tube to the generator side of the conductor 3. Obviously the tube $8^a$, if of sufficient thickness, may be provided with grooves corresponding to the convolutions of the coil 7, the resulting structure being the same to all intents and purposes as that just described.

In Fig. 4 the apparatus is the same as in Fig. 2, except that the conductors 3 and 4, being both insulated, are both provided with the lightning-arresters, such as have been already described in connection with Fig. 2.

While I have shown each lightning-arrester as provided with a plurality of electrolytic cells connected in series, my invention contemplates the employment of a single cell, if desired, and I do not intend to limit my claims either in terms or constructively to any specific number of such cells.

I claim as my invention—

1. In a lightning-arrester, a spark-gap comprising a coiled or bent portion of an electric conductor and a conducting-tube surrounding the said portion and having internal ribs or projections between the turns of the coil but not in contact therewith.

2. The combination with a coiled or bent conductor in an electric circuit, and a conducting-tube surrounding said conductor but insulated therefrom, of an electrolytic cell or a series of such cells one terminal of which is connected to said tube.

3. The combination with a conducting-coil in an electric circuit, and a conducting-tube surrounding said coil and having ribs or projections between the turns of the coil, of an electrolytic cell or a series of such cells having one terminal connected to said tube and the other terminal connected to ground.

In testimony whereof I have hereunto subscribed my name this 7th day of February, 1899.

CHARLES J. REED.

Witnesses:
JAMES W. LAWS,
ROBT. B. FLETCHER.